(12) United States Patent
Liberty et al.

(10) Patent No.: US 12,475,406 B1
(45) Date of Patent: Nov. 18, 2025

(54) EFFICIENT MODEL GENERATION USING MACHINE LEARNING STATES

(71) Applicant: Amazon Technologies, Inc., Seattle, WA (US)

(72) Inventors: Edo Liberty, New York, NY (US); Zohar Karnin, Hoboken, NJ (US)

(73) Assignee: Amazon Technologies, Inc., Seattle, WA (US)

(*) Notice: Subject to any disclaimer, the term of this patent is extended or adjusted under 35 U.S.C. 154(b) by 1695 days.

(21) Appl. No.: 15/821,730

(22) Filed: Nov. 22, 2017

(51) Int. Cl.
*G06N 20/00* (2019.01)

(52) U.S. Cl.
CPC .................... *G06N 20/00* (2019.01)

(58) Field of Classification Search
CPC ................ G06N 20/00; G06N 5/02
See application file for complete search history.

(56) References Cited

U.S. PATENT DOCUMENTS

| | | | | |
|---|---|---|---|---|
| 10,713,594 B2* | 7/2020 | Szeto | ............... | G06N 20/00 |
| 2009/0037829 A1* | 2/2009 | Sun | ............... | G06Q 30/06 |
| | | | | 709/201 |
| 2012/0191630 A1* | 7/2012 | Breckenridge | ........ | G06N 20/00 |
| | | | | 706/12 |
| 2015/0339572 A1* | 11/2015 | Achin | ............... | G06N 20/00 |
| | | | | 706/46 |
| 2015/0379424 A1* | 12/2015 | Dirac | ............... | G06N 20/00 |
| | | | | 706/12 |
| 2016/0026923 A1* | 1/2016 | Erenrich | ............. | G06F 16/2455 |
| | | | | 706/52 |
| 2016/0259043 A1* | 9/2016 | Schär | .................. | G01S 13/87 |
| 2018/0314938 A1* | 11/2018 | Andoni | ................. | G16H 50/70 |

OTHER PUBLICATIONS

Braverman, Vladimir, et al. "New frameworks for offline and streaming coreset constructions." arXiv preprint arXiv:1612.00889 (2016). https://arxiv.org/pdf/1612.00889v1.pdf (Year: 2016).*
Bacciu, Davide, et al. "On the need of machine learning as a service for the internet of things." Proceedings of the 1st International Conference on Internet of Things and Machine Learning. 2017. https://dl.acm.org/doi/pdf/10.1145/3109761.3109783 (Year: 2017).*
Buitinck, Lars, et al. "API design for machine learning software: experiences from the scikit-learn project." https://www.researchgate.net/publication/256326897_API_design_for_machine_learning_software_Experiences_from_the_scikit-learn_project (Year: 2013).*

(Continued)

*Primary Examiner* — Kakali Chaki
*Assistant Examiner* — Michael H Hoang
(74) *Attorney, Agent, or Firm* — Nicholson De Vos Webster & Elliott LLP

(57) ABSTRACT

Techniques for model variant generation using machine learning states are described. A machine learning state data structure is generated via an analysis of training data. The machine learning state can be used to quickly and efficiently generate multiple variants of a machine learning model without needing to re-analyze the raw training data again.

20 Claims, 9 Drawing Sheets

(56) References Cited

OTHER PUBLICATIONS

Ahmadi B, Kersting K, Natarajan S. Lifted online training of relational models with stochastic gradient methods. InMachine Learning and Knowledge Discovery in Databases: European Conference, ECML PKDD 2012, Bristol, UK, Sep. 24-28, 2012. Proceedings, Part I 23 2012 (pp. 585-600). (Year: 2012).*

[Item U continued] https://link.springer.com/chapter/10.1007/978-3-642-33460-3_43 (Year: 2012).*

Har-Peled, Sariel, and Soham Mazumdar. "On coresets for k-means and k-median clustering." In Proceedings of the thirty-sixth annual ACM symposium on Theory of computing, pp. 291-300. ACM, 2004. Harvard.

"K-means clustering," Wikipedia, 12 pages, Nov. 21, 2017, Retrieved from the internet: https://en.wikipedia.org/wiki/K-means_clustering.

\* cited by examiner

EFFICIENT MODEL GENERATION USING MACHINE LEARNING STATES

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
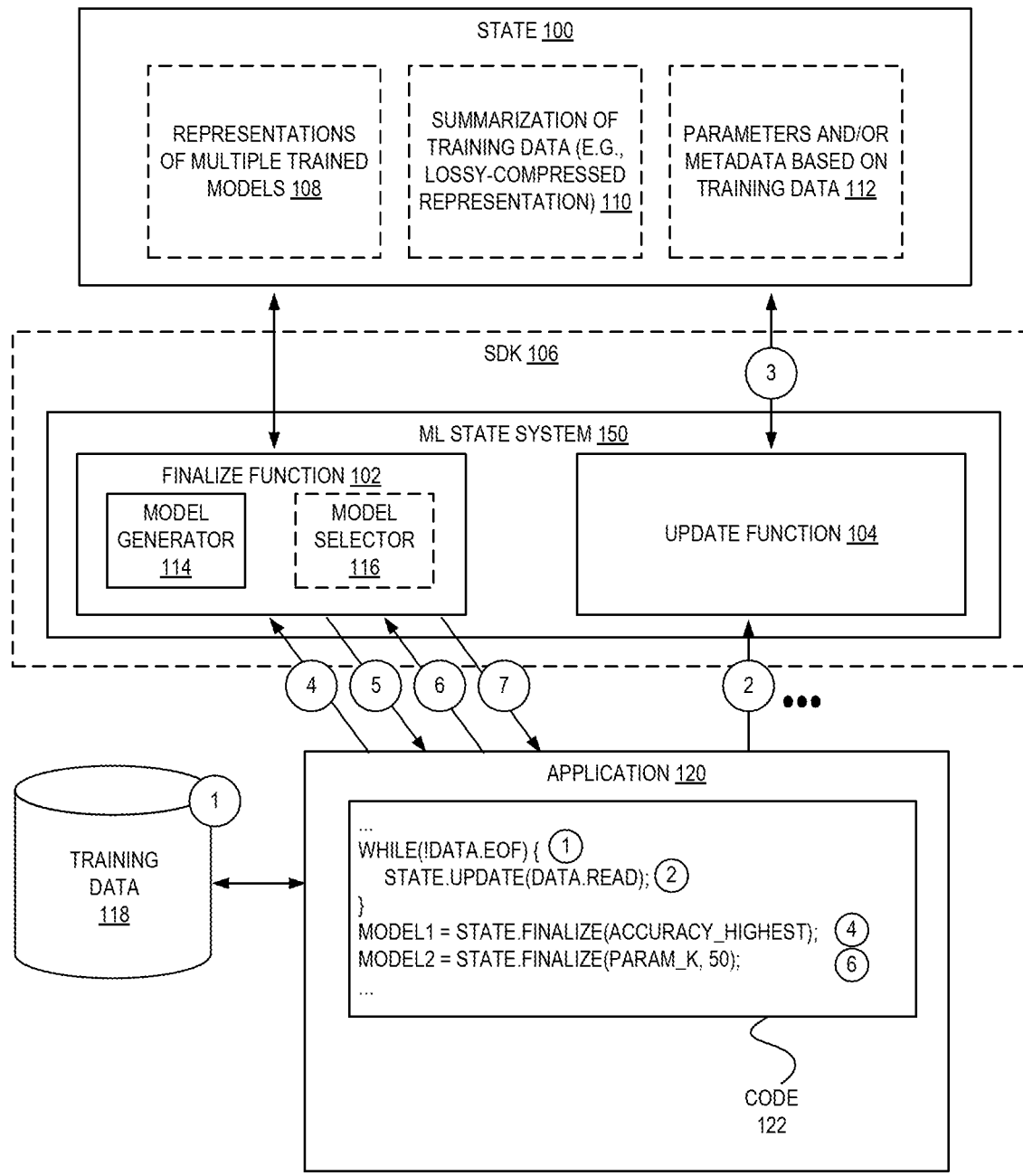
FIG. 1 is a diagram illustrating an environment for efficient model variant generation using machine learning states according to some embodiments.

Various embodiments of methods, apparatus, systems, and non-transitory computer-readable storage media for efficient model variant generation using machine learning states are described. According to some embodiments, machine learning "state" data structures can be generated through an analysis of training data. The machine learning states can be used to quickly and efficiently generate multiple variants of a machine learning model without needing to re-examine the raw training data again and again. Accordingly, users can quickly generate and test different variants of a model, e.g., using different hyperparameters, instead of painstakingly generating multiple variants from scratch, which is extremely time consuming.

In the field of machine learning, training data is processed in order to produce a model. This model can be used as a function on other data, resulting in results such as predictions or inferences. However, during "offline" computation tasks (e.g., using stored or readily-available training data), to tune a model one must typically train a model more than once with different parameters (e.g., hyper-parameters). This selection of different parameters can vary in many ways, depending on the type of model to be learned, the type of training data that is being worked with, etc. Thus, many practitioners will treat the training procedure as a black box, and repeatedly attempt to train a model by tuning different parameters in a hope to find particular parameters or a combination of parameters that results in a "best" model.

As one example, for training regression models, one parameter commonly used is a regularization parameter, which will change how accurate the resulting model will eventually be. In many cases, the regularization parameter can be a numeric value that is chosen and provided during training. However, selecting a "best" regularization parameter is extremely difficult, and as a result, practitioners generally select values that are generally larger for smaller training sets, and values that are generally smaller with larger training sets. Even so, identifying which precise value or values to pick is difficult, and as a result they are commonly found only through trial and error, thus requiring multiple variants of the model to be trained using different regularization parameter values.

Similarly, other types of machine learning model training procedures involve other types of parameters that can be chosen and that ultimately affect the quality of the resultant model. As a result, for a huge number of machine learning algorithms, it is typically a necessity to train multiple variants of a model with different parameters or combinations of parameters to attempt to find a good model. To train multiple variants of models, it can take an extremely long amount of time and computing resources. For example, in a scenario where there is a terabyte (or more) of training data, one way to generate two test models is to read the data, process it, and train a first model; then, the training data is read again, processed again, and a second model is thus trained.

Embodiments disclosed herein can avoid such time and resource expensive re-computations of model variants by modifying the model generation process. According to some embodiments, when processing the training data, the training algorithms creates a state. The state could include learned parameters, sampled data points, arbitrary data structures or values, input parameters, representations of multiple trained models, lossy-compressed representations of the training data, etc. Thereafter, the state itself can be further processed to obtain a model, while the state itself is not typically executable as a model is.

For example, in some embodiments the training data may be processed once to result in the state, and then multiple models can be generated using this state. This approach produces a same result as if each model were directly generated using the training data via traditional techniques. However, through the use of state, the process to learn multiple models typically will take significantly less time, as the disk overhead involved to access the training data can be amortized across the number of models created. Thus, this effect is further pronounced when more models are sought to be trained, e.g., three models, five models, ten models, one-hundred models, and so on.

Additionally, some embodiments provide benefits to scenarios using a streaming mode for the training data, e.g., where the training data in provided an online manner such that it may only be read once. Accordingly, instead of being limited to a single model, embodiments disclosed herein can generate multiple variants of a model using a single constructed state data structure.

In some embodiments, a developmental kit (e.g., a software development kit (SDK)) for developing algorithms can be provided that provides functionalities allowing users to train multiple model variants easily. In some embodiments, calculating the multiple models can include performing a brute force approach where some or all models are trained in parallel.

Embodiments can thus enable many different models to be obtained using the same state. Beneficially, embodiments can be particularly useful when utilizing streaming training data in which one might need to change the model but be unable to reprocess the data.

FIG. 1 is a diagram illustrating an environment for efficient model variant generation using machine learning states according to some embodiments. This environment includes a state 100 (also referred to herein as a state data structure), a machine learning (ML) state system 150, an application 120, and training data 118.

As illustrated, the ML state system 150 may include a finalize function 102 and an update function 104, each of which may comprise a block (or blocks) of software logic. This ML state system 150 may be provided to users, for example, as part of an SDK 106, and may be used as follows.

As shown in FIG. 1, a training application 120 (e.g., code 122 comprising a set of instructions, in some programming language or languages) includes instructions causing a state 100 data structure to be generated, and thereafter, multiple models (or "model variants") to be generated using the state 100 data structure.

To generate the state 100 data structure, the training data can be iterated over (e.g., in mini-batches) to generate the state one element at a time. For example, the code 122 of the application 120 may include instructions to load or read training data 118 (e.g., from a local or remote device) at circle '1'. For every piece of data, the application 120 can call an update function 104—e.g., via a "state.update" invocation shown at circle '2'—to update the state 100 data structure at circle '3' using the piece of read training data. For example, for every element that is read, the state 100 data structure can be updated.

In some embodiments, the update function 104 can be an abstract method. For example, for the stochastic gradient descent (SGD) algorithm, the state 100 data structure may be updated, for example, by doing one gradient step. Similarly, for updating the state 100 data structure for the well-known k-means algorithm, the update function 104 may assign the point to a center, and then shift the center slightly toward that point.

Thus, as a client repeatedly calls the state.update function 104, at all points of time a state 100 data structure exists from which models can be generated with different parameters. Thus, the application 120 may repeatedly call the function until all of the training data 118 has been used, or stop earlier if desired. In some cases, upon the conclusion of the update portion, the application 120 can call a finalize function 102—e.g., via a "state.finalize" invocation shown at circle '4'-which, based on the current representation of the state 100 data structure, causes a model to be trained from the state 100 data structure that is tuned according to some indicated objective or parameters.

For example, at circle '4', the code 122 indicates that a model is to be generated that has a highest accuracy (as reflected using the exemplary ACCURACY_HIGHEST argument). In response, the finalize function 102 may use a model generator 114 subcomponent (e.g., software block(s), libraries, etc.) to generate a number of models and then a model selector 116 subcomponent to select between those models to identify which of the models satisfies the stated objective-here, a highest accuracy. The finalize function 102 may then return the model at circle '5', which may be performed by returning a reference to the model (e.g., a pointer, a file system location, etc.). For example, a model may be trained to be an anti-spam model, and thus a user may wish to find a model that catches the most spam, but has a precision of at least 99%. Thus, this objective may be provided to the finalize function 102 via, for example one or more arguments of a function call.

The code 122 shown in FIG. 1 further illustrates another call to the finalize function 102 at circle '6', in which a model is requested to be generated using a particular parameter-here, a parameter named "k" having a value of "50", which could be a number of clusters to find for a k-means clustering algorithm, for example. In response, the model generator 114 may generate the particular desired model and return a reference to the model at circle '7'.

The model generator 114 subcomponent can generate models in a variety of ways depending upon the implementation. For example, the state 100 data structure may include representations 108 of multiple trained models, where each model was trained in a somewhat parallel manner with each update function 104 call. In this case, the model generator 114 subcomponent may simply identify a matching model from the representations 108 of multiple trained models, and perform any further reformatting/transformations that may be needed to create a valid model from the perspective of the caller code 122.

As another example, the state 100 data structure may include a summarization 110 of training data (e.g., a lossy-compressed representation), and thus, the model generator 114 subcomponent may generate a desired model by performing portions of the involved ML algorithm using the summarization 110 of training data. In some embodiments, the summarization 110 of training data may be small enough to completely or substantially reside in memory, and thus the generation of a new model from this data is significantly faster and more efficient than a traditional approach, which would require going back to the original training data 118.

As an example, embodiments can use—from the state—a summary of the training data, which may be lossy, to train models much faster and with fewer resources. In some embodiments, the state 100 includes a summarization 110 in the form of an adapted version of the concept of coresets, which is a summary of the entire data upon which the k-means algorithm can be run (instead of operating upon the original dataset). Thus, if the original dataset includes fifty million points, the summary (or coreset) of the dataset might only include two-thousand points, which can be operated on much more quickly, possibly using only memory (instead of disk accesses), etc., while still remaining representative or expressive of the entire original dataset. Again, this concept can be extended to other model algorithms outside of k-means, and thus a summarized (possibly lossy) version of the training data can be generated as part of the state, and thus multiple modes can be trained—with different parameters—very quickly by operating upon the compressed training set and/or via parallel computation of different model variants (e.g., due to different parameters).

In some embodiments, the state 100 data structure includes one or more parameters and/or metadata elements 112 based on the training data, which can be used during model generation to more quickly generate models as beneficial parameters (e.g., for running a learning procedure) may already be determined/updated as the state 100 has been updated.

Thus, during a pass of the data, another data structure of the state can be generated based on this data, though be of a different form (or represent different information) yet still be useful for training a model from. For example, a state value could be a parameter (e.g., a likely "best" parameter based on an analysis of the training data), etc., that does not look like the training data, but is still useful in generating models efficiently. Thus, although a state could be a subset or representation of the training data such as example points with corresponding weights (which may be useful for k-means), a state value could comprise other statistics based on the training data, etc.

As another example, the k-means clustering algorithm uses an input of k, which indicates the number of desired clusters. If a caller does not know what an optimal value of k should be, traditionally many different values of k are tried and the best resultant model can be selected. However, in some embodiments, a summary of the training data of the state 100 is generated via the update function 104, based on which a k-means model can be output for any size of k that is smaller than some threshold number. For example, a k-means model can be trained for the threshold number (e.g., 1000), and embodiments preserve the state, which summarizes the data by folding in all of the information needed to create the models that may be needed. Thus, to acquire a particular model from the state 100, a caller can call the finalize function 102 to get a k-means model for a particular size (e.g., k=50). Provided that the requested size is smaller than the threshold value, the model can be quickly generated using the preserved state. Accordingly, the desired model can be trained in a fraction of the time required when compared to the traditional approach, e.g., seconds or minutes instead of hours. As a result, users can generate multiple different models (e.g., k-means with k=1, 2, 5, 10, 15, 30, 50, 100, etc.) in an extremely short amount of time. Beneficially, in addition to the rapid formation of new models, embodiments can also save significant processing resources, network bandwidth, memory usage, etc., that would have ordinarily had to have been used.

As another example, embodiments can train multiple models (e.g., thirty linear models with thirty different parameters), and the state 100 may include thirty—or more—linear functions. Thus, given some validation data, embodiments can, based on this validation data and the linear functions state, generate a model that performs best on it.

The state can be of a variety of types and may or may not be specific to a particular algorithm. Thus, in some cases, a particular state may be specific to a particular algorithm; a specialized state for a special algorithm may be extremely performant. For example, for k-means clustering, a state representing a coreset can be tracked that works specifically well for k-means (and similar) algorithms.

However, "general" state 100 values can be created that work well for many types of algorithms, such as a state tracking a uniform sampling of the training data set, a representation of biased sampling of training data according to labels (which can be good for many types of classification algorithms, irrespective of whether they are linear classifiers or something else), etc.

Figure 2:
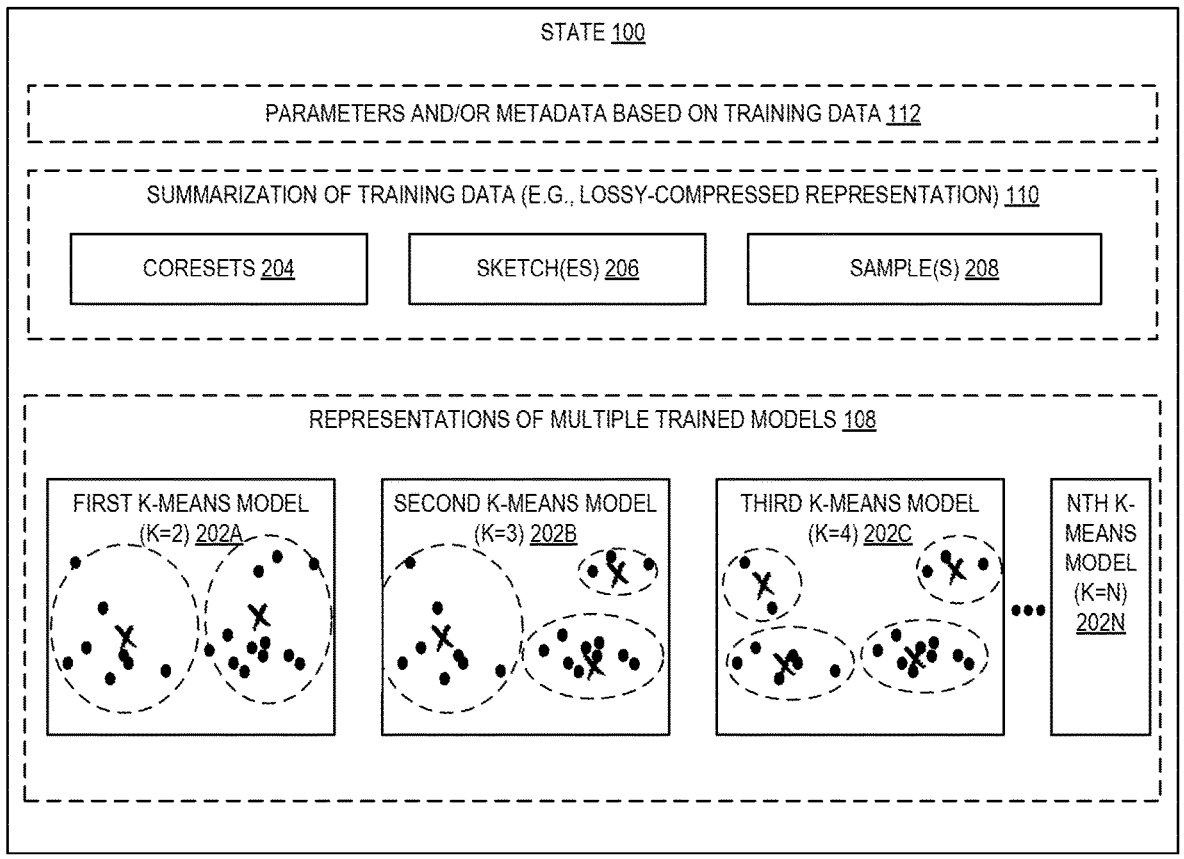
FIG. 2 is a diagram illustrating exemplary types of state data that can be utilized for efficient model variant generation according to some embodiments.

For additional detail regarding state 100, FIG. 2 is a diagram illustrating exemplary types of state data that can be utilized for efficient model variant generation according to some embodiments. As shown, the state 100 data structure may include parameters and/or metadata 112 (e.g., statistics) based on training data. In some cases, the state 100 data structure may include a summarization 110 of the training data, which may be a lossy-compressed representation. Three examples of such lossy-compressed representations are shown in the form of coresets 204 (e.g., which may be most useful for k-means type algorithms or other geometric-type algorithms), sketches 206 (e.g., which may be particularly useful for streaming data scenarios), and/or samples 208. Sampling (to yield samples 208) and coresets 204, for example, are techniques for keeping a subset of points from the data such that the original training data remains well-represented.

In some cases, the state 100 data structure may include representations 108 of multiple trained models. As shown, one example involving the k-means algorithm includes N different models 202A-202N that are trained together with each update function 104 call, where each model utilizes a different "k" parameter indicating a number of clusters to be found.

As another example, a linear algorithm could be used to create an anti-spam model. In one scenario, representations 108 of multiple trained models could be used by, in the update function, running Stochastic gradient descent (SGD) in parallel with multiple objective functions—e.g., different loss, different penalties for false positives, etc., to train multiple functions in parallel, which can be kept as the state 100.

In another scenario, the update function may instead update a summarization 110 of the training data in the form of a subset of the training data. For example, the update function may add each point to the state or ignore/discard it, or may use some other summarization technique.

When the finalize function is called, when multiple models were trained, the best one could be selected, potentially modified (e.g., to be ready to be used), etc. If a summarization 110 were used instead, the finalize function can use the summary by training over that summary to get the desired model.

Of course, hybrid scenarios also exist in which multiple types of values are kept and updated in the state 100. For example, in some embodiments multiple models are trained and also a sample of the data is kept. The finalize function may then, for example, train a new model, but the starting point will be those pre-trained starting points reflected by the state.

Figure 3:
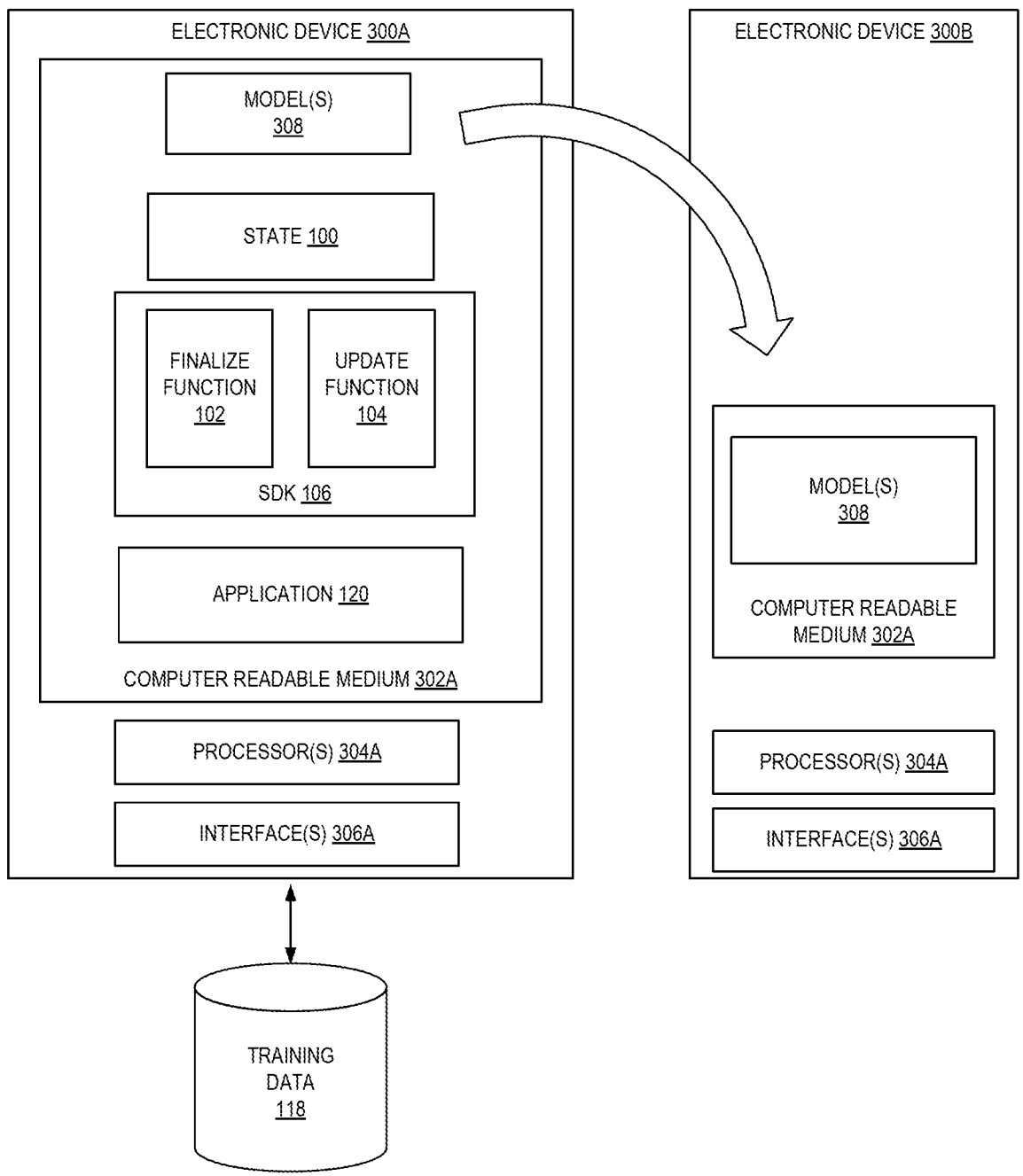
FIG. 3 is a diagram illustrating exemplary components of electronic devices in an environment utilizing efficient model variant generation using machine learning states according to some embodiments.

FIG. 3 is a diagram illustrating exemplary components of electronic devices 300A-300B in an environment utilizing efficient model variant generation using machine learning states according to some embodiments. In this depiction, a SDK 106 may be provided to a user who installs it on an electronic device 300A (e.g., in a storage or memory such as a computer readable medium 302A), and may develop or utilize an application 120 (which also may be stored in a computer readable medium 302A) that can access training data 118 (e.g., using an interface 306A such as a physical or virtual network interface, Universal Serial Bus (USB) interface, etc.) and utilize the SDK 106 to create and update a state 100 data structure, and thereafter create one or multiple models 308. One of the models 308 may be used by deploying (e.g., via an interface 306A) it to a computer readable medium 302A of another electronic device 300B, such as an Internet of Things (IoT) device, camera device, smart speaker device, smart thermostat, or other sensor device, for example.

Figure 4:
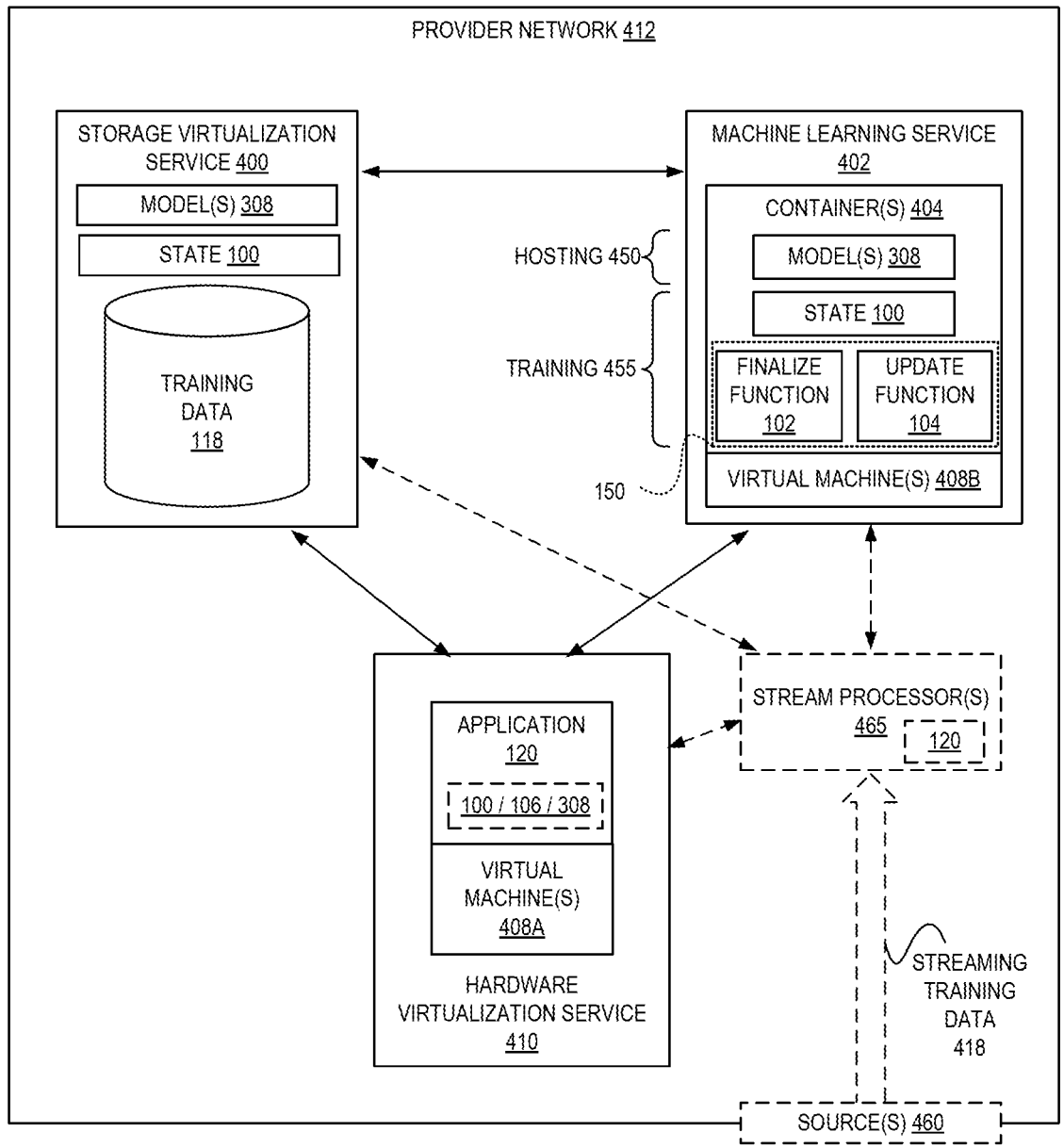
FIG. 4 is a diagram illustrating exemplary deployment within a provider network implementing efficient model variant generation using machine learning states according to some embodiments.

However, other possible deployments also can beneficially be used. FIG. 4 is a diagram illustrating exemplary deployment within a provider network 412 implementing efficient model variant generation using machine learning states according to some embodiments.

A provider network 412 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 412 may utilize one or more user accounts that are associated with a customer account, though these terms may be used somewhat interchangeably depending upon the context of use. Users may interact with a provider network 412 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 412 may utilize virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Thus, a user may deploy an application 120 (which may execute upon one or more virtual machines 408A or other types of compute instances) using a hardware virtualization service 410. The application 120 may include the SDK 106 (and/or the model 308 and/or the state 100) disclosed herein, or may access the state and model building functionalities via a training 455 portion of a machine learning service 402 of the provider network 412, which may be deployed via one or more containers 404 that may execute on top of virtual machines 408B. Additionally, in some embodiments the resultant model(s) 308 can be deployed as part of a hosting 450 portion of the machine learning service 402. In some embodiments, the training data 118 may be hosted and served via a storage virtualization service 400, and the generated models 308 may similarly be stored by the storage virtualization service 400. Additional detail regarding a storage virtualization service 400 and hardware virtualization service 410 is provided later herein with regard to subsequent figures.

Some embodiments can operate using streaming training data 418 that is generated by one or more sources 460 that may be within or external to the provider network 412. The streaming training data 418 can be directed toward one or more stream processors 465, which can operate upon the streaming training data 418 in a variety of ways to allow a state 100 to be constructed. For example, the stream processor(s) 465 may capture, process, and store a representation of the streamlining training data 418 within the storage virtualization service 400 as training data 118, which later can be operated upon by an application 120 as described earlier. As another example, in some embodiments the stream processor(s) 465 include some or all of the application 120, and thus may utilize the update function 104 to generate and update the state 100 data structure.

Figure 5:
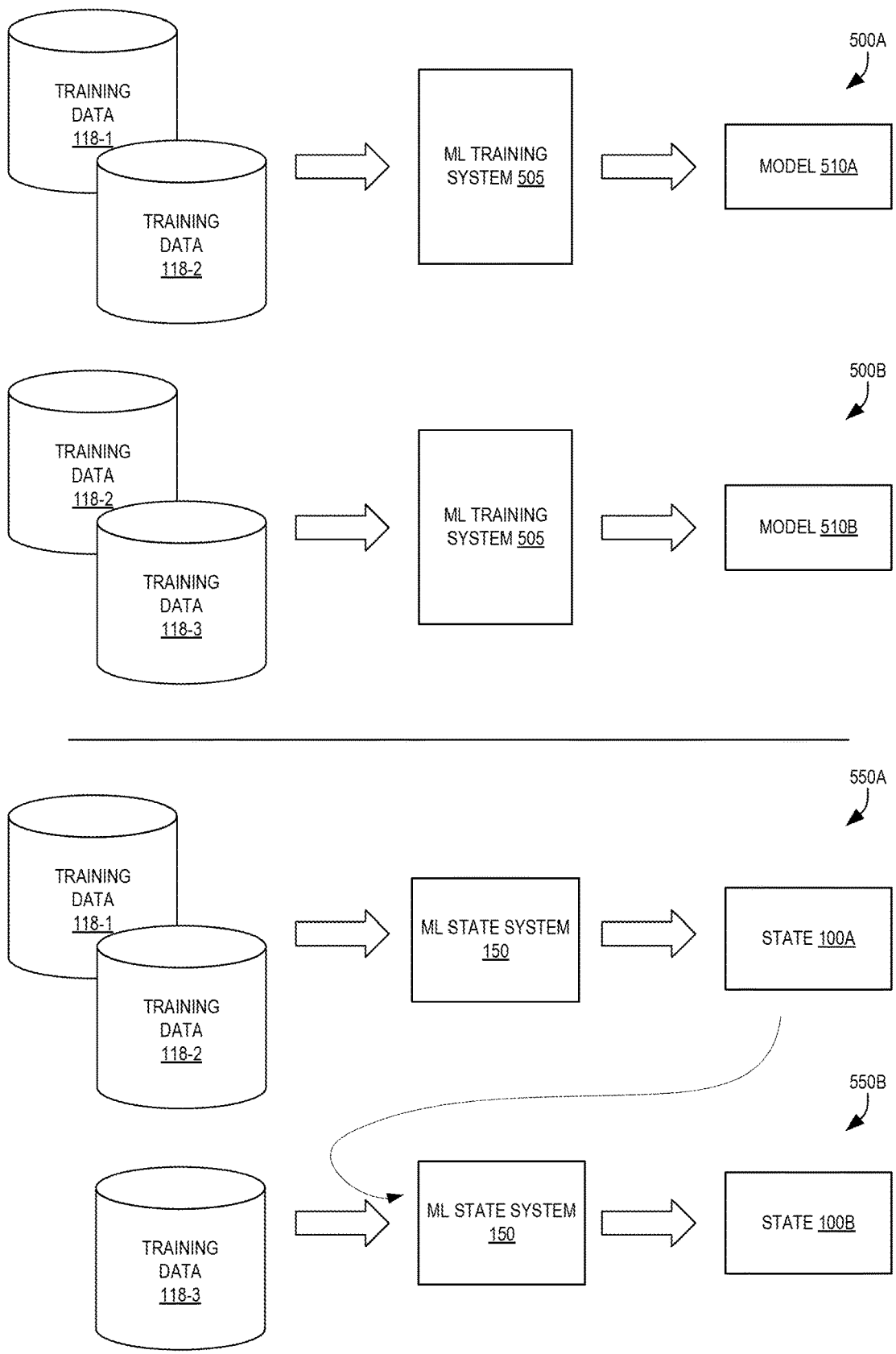
FIG. 5 is a diagram illustrating a traditional incremental learning technique and an exemplary incremental learning technique using machine learning states according to some embodiments.

Another beneficial way that machine learning states can be utilized is for incremental training scenarios. In some cases, a user may desire to have a model that is based on training data from a previous rolling period of time. Thus, a user may repeatedly seek a new version of a model based on, for example, the previous two months of training data to ensure that the model can appropriately accommodate changes over time. For example, FIG. 5 is a diagram illustrating a traditional incremental learning technique 500A-500B and an exemplary incremental learning technique 550A-550B using machine learning states according to some embodiments.

Using a traditional model development technique 500A, a first model 510A is trained via a ML training system 505 using a number of previous collections of training data—here, a first training data 118-1 and a second training data 118-2, which may represent data from a first month and a second month, for example. As time goes on, the model 510A may be updated to more heavily be reliant on "recent" data, such that the training data 118-1 from the first collection is to be relied upon less or not at all. Thus, under the traditional model development technique 500B, the training data 118-2 and a new set of training data 118-3 can be used, via the ML training system 505, to generate an "updated" model 510B. Notably, this process is quite expensive in terms of computation time, required resources, etc.

Alternatively, some embodiments utilize a state-based incremental learning technique 550A-550B, in which the ML state system 150 described herein can generate a first state 100A based on training data 118-1 and training data 118-2. At this point, the user can construct a large number of variants of a model using this state 100A. However, as a need for an incremental update develops, via technique 550B the ML state system 150 can use the existing state 100A with the new training data 118-3 to generate a new or updated state 100B. This process, notably, can be performed significantly less expensively as the existing state 100A can bootstrap the process, the previous training data 118-2 need not be re-analyzed (and thus, may optionally be deleted), etc. Again, at this point, in addition to creating the updated state 100B much faster and easier than the creation of the new model 500B under the traditional technique 500B, the user is also able to quickly generate potentially a large number of different models from the state 100B.

However, in addition to users of existing applications seeking to train new and use new models, embodiments are also useful for algorithm developers, who could use a SDK disclosed herein to allow the developers to easily implement their own update and finalize functions.

Figure 6:
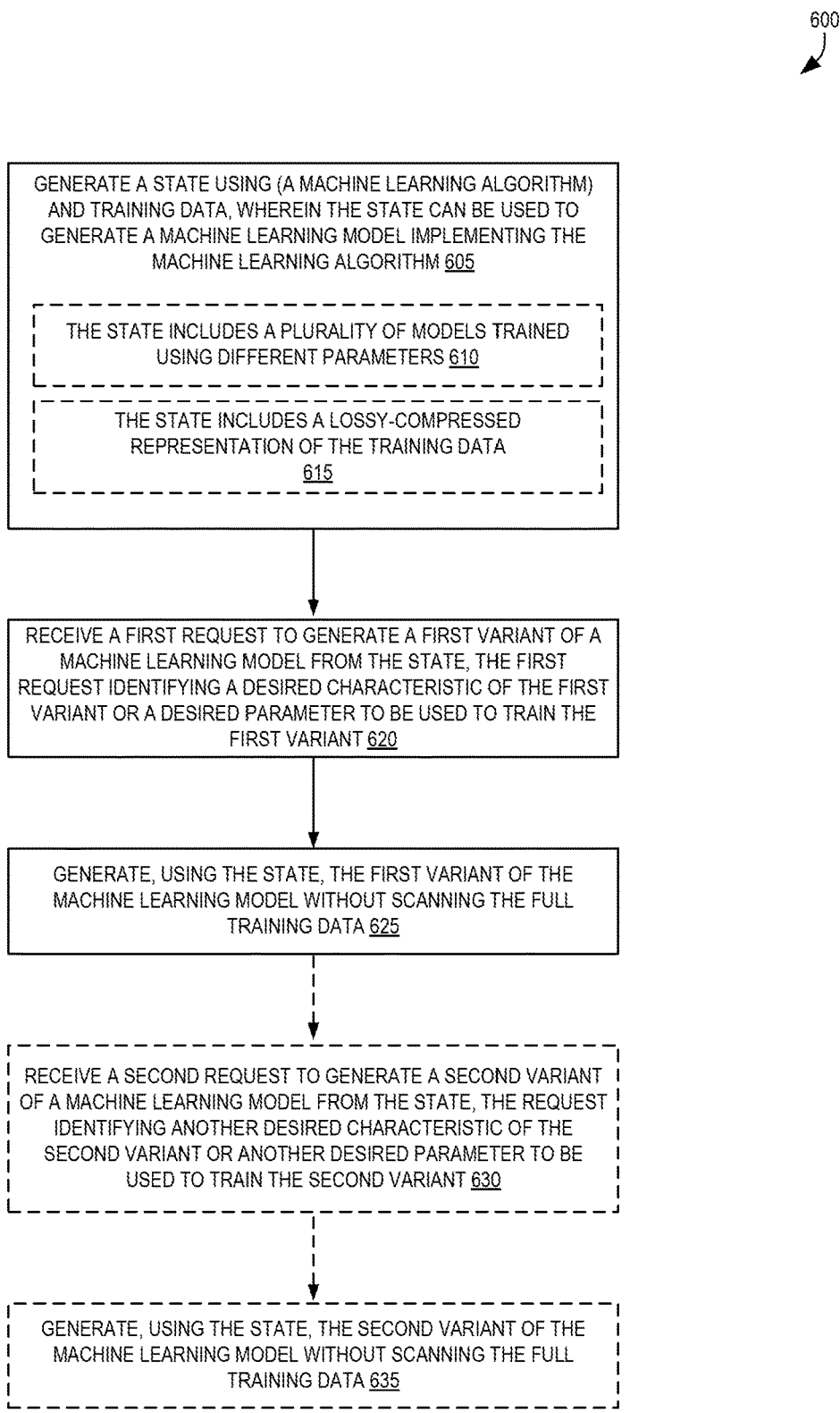
FIG. 6 is a flow diagram illustrating exemplary operations for efficient model variant generation using machine learning states according to some embodiments.

FIG. 6 is a flow diagram illustrating exemplary operations for efficient model variant generation using machine learning states according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the ML state system 150 and/or SDK 106 of the other figures.

The operations 600 include, at block 605, generating a state data structure using (optionally a machine learning algorithm along with) training data, wherein the state can be used to generate a machine learning model implementing the machine learning algorithm. As discussed, a state data structure may not be directly executed to perform prediction/inference, though instead can be used to generate multiple variants of models that can be executed to perform prediction/inference. The state data structure may include representations of multiple trained models (e.g., trained in parallel), a summarization of the training data (e.g., a lossy-compressed representation), and/or parameters and/or metadata based on training data. In some embodiments, as shown by block 610, the state includes a plurality of models trained using different parameters, and in some embodiments, as shown at block 615, the state includes a lossy-compressed representation of the training data such as one or more coresets, sketches, and/or samples.

The operations 600 include, at block 620, receiving a first request to generate a first variant of a machine learning model from the state. The request may be an API call or function call. The first request identifies a desired characteristic of the first variant (e.g., a maximal accuracy, etc.) or a desired parameter (e.g., k=2) to be used to train the first variant.

The operations 600 include, at block 625, generating, using the state, the first variant of the machine learning model without scanning the full training data. Generating the first variant may include selecting (and perhaps modifying for execution) one of multiple trained models of the state data structure, or may include training a model using a summarization of training data and/or parameters of the state data structure.

Optionally, the operations 600 include block 630 and receiving a second request to generate a second variant of a machine learning model from the state, the request identifying another desired characteristic of the second variant or another desired parameter to be used to train the second variant, and block 635 and generating, using the state, the second variant of the machine learning model without scanning the full training data. The second request may seek another variant of the same type of model—e.g., a particular type of classifier—but using different parameters, for example. This additional model can be easily generated using the state data structure, without needing to again access the original training data.

Figure 7:
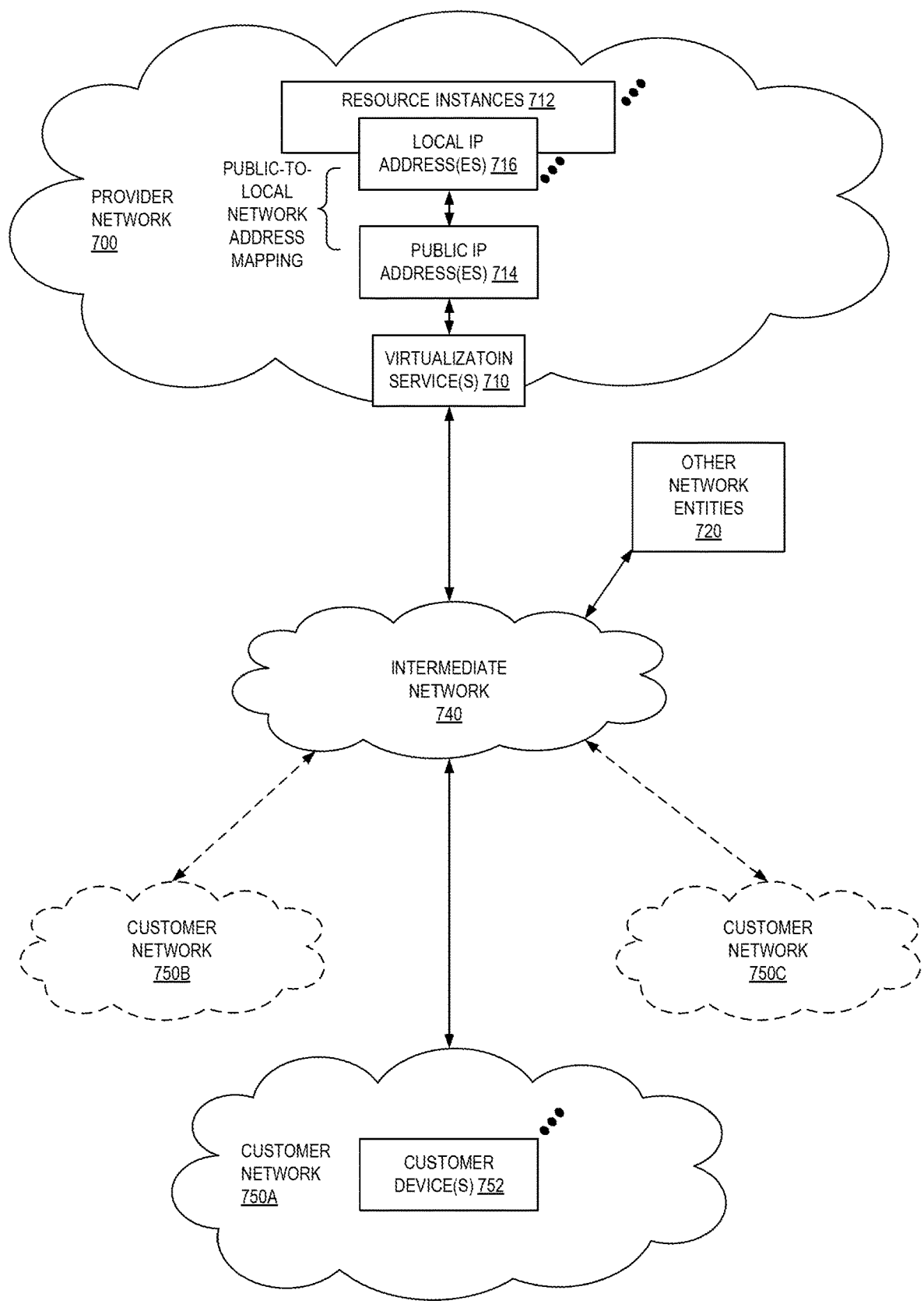
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
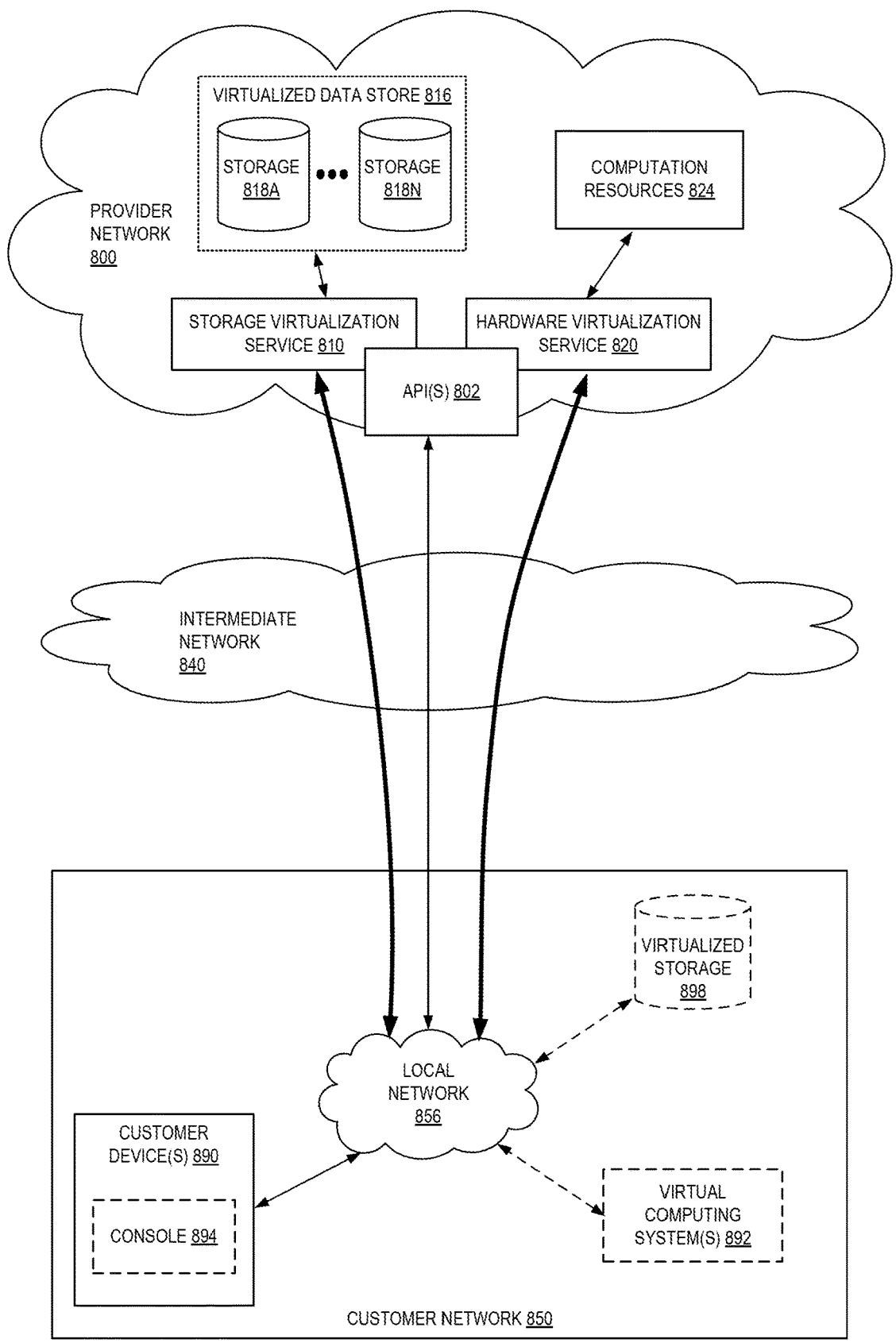
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
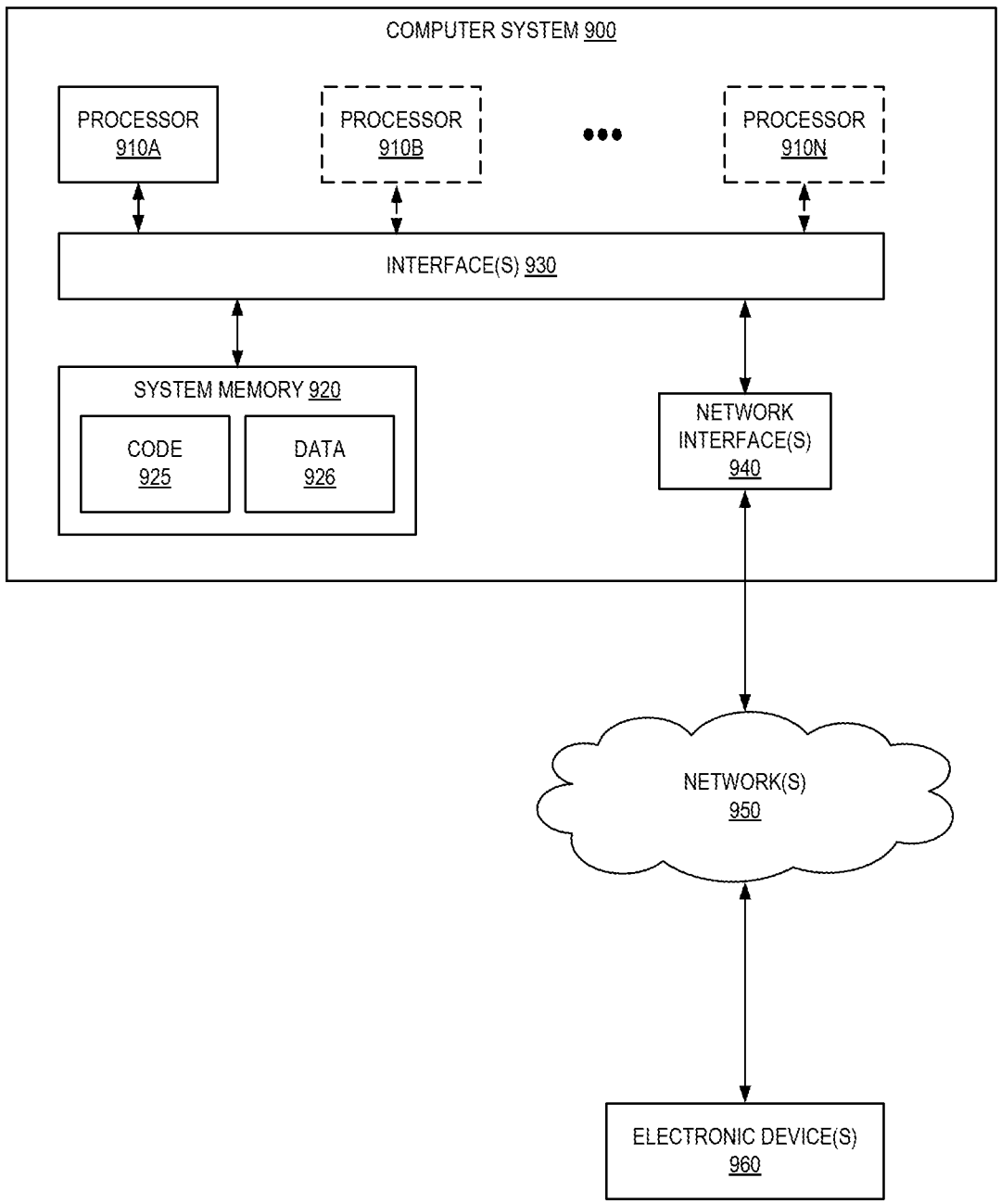
FIG. 9 is a block diagram illustrating an example computer system that may be used in some embodiments.

In some embodiments, a system that implements a portion or all of the techniques for model variant generation using machine learning states as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 920 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 202A-202N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   generating a state data structure using a machine learning algorithm and a set of training data, wherein the state data structure can be used to generate a machine learning model, wherein the state data structure itself does not comprise an executable machine learning model, and wherein the state data structure comprises a lossy-compressed representation of the set of training data;
   receiving a first request to generate a first variant of the machine learning model from the state data structure, the first request identifying a first desired characteristic of the first variant or a first desired parameter to be used to train the first variant;

generating, based at least in part on the first desired characteristic or the first desired parameter and using the state data structure, the first variant of the machine learning model without scanning the full set of training data, wherein the generating comprises using the lossy-compressed representation of the set of training data instead of the set of training data to produce the first variant;

receiving a second request to generate a second variant of the machine learning model from the state data structure, the second request identifying a second desired characteristic of the second variant or a second desired parameter to be used to train the second variant; and generating, based at least in part on the second desired characteristic or the second desired parameter and using the state data structure, the second variant of the machine learning model without scanning the full set of training data, wherein the generating comprises using the lossy-compressed representation of the set of training data instead of the set of training data to produce the second variant.

2. The computer-implemented method of claim 1, wherein the set of training data comprises a plurality of elements, and wherein generating the state data structure comprises updating the state data structure one element of the training data at a time.

3. The computer-implemented method of claim 1, wherein the lossy-compressed representation of the set of training data comprises one or more coresets.

4. A computer-implemented method comprising:
generating a state data structure using a machine learning algorithm and a set of training data, wherein the state data structure can be used to generate machine learning model variants, wherein the state data structure comprises a lossy-compressed representation of the set of training data, and, wherein the state data structure itself does not comprise an executable machine learning model;

generating, based at least in part on a first one or more parameter values, a first variant of a machine learning model based on the state data structure without scanning the full set of training data, wherein the generating comprises using the lossy-compressed representation of the set of training data instead of the set of training data to produce the first variant; and generating, based at least in part on a second one or more parameter values, a second variant of the machine learning model based on the state data structure without scanning the full set of training data, wherein at least one of the first one or more parameter values used to generate the first variant is different than at least one of the second one or more parameter values used to generate the second variant, and wherein the generating comprises using the lossy-compressed representation of the set of training data instead of the set of training data to produce the second variant.

5. The computer-implemented method of claim 4, wherein the state data structure further comprises one or more metadata elements, wherein the metadata elements are based on the set of training data.

6. The computer-implemented method of claim 4, wherein the lossy-compressed representation of the set of training data comprises one or more coresets.

7. The computer-implemented method of claim 4, further comprising:

receiving a first request to generate the first variant, the first request identifying a first desired characteristic of the first variant or a first desired parameter of the first variant; and receiving a second request to generate the second variant, the second request identifying a second desired characteristic of the second variant or a second desired parameter of the second variant.

8. The computer-implemented method of claim 7, wherein the first request comprises a call to a function provided by a software development kit (SDK).

9. The computer-implemented method of claim 7, wherein the first request identifies the first desired characteristic, wherein the first desired characteristic is a highest accuracy or an accuracy above a threshold value.

10. The computer-implemented method of claim 4, further comprising deploying at least one of the first variant of the machine learning model or the second variant of the machine learning model to an electronic device.

11. The computer-implemented method of claim 10, wherein the electronic device comprises one or more sensor components, and wherein the deployed model generates inferences via use of sensor data output by the one or more sensor components.

12. The computer-implemented method of claim 4, wherein the set of training data comprises a plurality of elements, and wherein generating the state data structure comprises updating the state data structure one element of the training data at a time.

13. A non-transitory computer readable storage medium having instructions which, when executed by one or more processors of a computing device, cause the computing device to perform operations comprising:

generating a state data structure using a machine learning algorithm and a set of training data, wherein the state data structure can be used to generate machine learning model variants, wherein the state data structure comprises a lossy-compressed representation of the set of training data, and wherein the state data structure itself does not comprise an executable machine learning model;

generating, based at least in part on a first one or more parameter values, a first variant of a machine learning model based on the state data structure without scanning the full set of training data, wherein the generating comprises using the lossy-compressed representation of the set of training data instead of the set of training data to produce the first variant; and generating, based at least in part on a second one or more parameter values, a second variant of the machine learning model based on the state data structure without scanning the full set of training data, wherein at least one of the first one or more parameter values used to generate the first variant is different than at least one of the second one or more parameter values used to generate the second variant, and wherein the generating comprises using the lossy-compressed representation of the set of training data instead of the set of training data to produce the second variant.

14. The non-transitory computer readable storage medium of claim 13, wherein the state data structure further comprises one or more metadata elements, wherein the metadata elements are based on the set of training data.

15. The non-transitory computer readable storage medium of claim 13, wherein the lossy-compressed representation of the set of training data comprises one or more coresets.

16. The non-transitory computer readable storage medium of claim 13, wherein the operations further comprise:
   receiving a first request to generate the first variant, the first request identifying a first desired characteristic of the first variant or a first desired parameter of the first variant; and
   receiving a second request to generate the second variant, the second request identifying a second desired characteristic of the second variant or a second desired parameter of the second variant.

17. The non-transitory computer readable storage medium of claim 16, wherein the first request comprises a call to a function provided by a software development kit (SDK).

18. The non-transitory computer readable storage medium of claim 16, wherein the first request identifies the first desired characteristic, wherein the first desired characteristic is a highest accuracy or an accuracy above a threshold value.

19. The non-transitory computer readable storage medium of claim 13, further comprising deploying at least one of the first variant of the machine learning model or the second variant of the machine learning model to an electronic device.

20. The non-transitory computer readable storage medium of claim 13, wherein the set of training data comprises a plurality of elements, and wherein generating the state data structure comprises updating the state data structure one element of the training data at a time.

* * * * *